(12) United States Patent
Umemoto

(10) Patent No.: US 11,460,751 B2
(45) Date of Patent: Oct. 4, 2022

(54) OPTICAL MODULATOR

(71) Applicant: TDK Corporation, Tokyo (JP)

(72) Inventor: Shusaku Umemoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/006,047

(22) Filed: Aug. 28, 2020

(65) Prior Publication Data

US 2021/0096441 A1    Apr. 1, 2021

(30) Foreign Application Priority Data

Sep. 26, 2019  (JP) .............................. JP2019-175795

(51) Int. Cl.
*G02F 1/225* (2006.01)
*G02F 1/03* (2006.01)
*G02F 1/21* (2006.01)

(52) U.S. Cl.
CPC .......... *G02F 1/2257* (2013.01); *G02F 1/0316* (2013.01); *G02F 1/212* (2021.01); *G02F 2201/07* (2013.01)

(58) Field of Classification Search
CPC ...... G02F 1/2257; G02F 1/0316; G02F 1/212; G02F 2201/07
See application file for complete search history.

(56) References Cited

U.S. PATENT DOCUMENTS

| | | | | |
|---|---|---|---|---|
| 4,142,006 A | * | 2/1979 | Choyke | G02B 5/0858 427/162 |
| 9,946,100 B2 | * | 4/2018 | Yanagawa | G02F 1/0316 |
| 2002/0167711 A1 | * | 11/2002 | Nespola | G02F 1/0356 359/245 |
| 2003/0128954 A1 | * | 7/2003 | Burns | G02F 1/035 385/140 |
| 2005/0047720 A1 | * | 3/2005 | Burns | G02F 1/225 385/40 |
| 2006/0209566 A1 | * | 9/2006 | Koike | F21V 7/28 362/623 |
| 2018/0011348 A1 | * | 1/2018 | Yanagawa | G02F 1/225 |
| 2019/0146302 A1 | | 5/2019 | Iwatsuka et al. | |

FOREIGN PATENT DOCUMENTS

| | | |
|---|---|---|
| JP | 5853880 B2 | 2/2016 |
| WO | 2016/158650 A1 | 10/2016 |
| WO | 2017/183484 A1 | 10/2017 |

* cited by examiner

*Primary Examiner* — Peter Radkowski
(74) *Attorney, Agent, or Firm* — McDermott Will & Emery LLP

(57) ABSTRACT

An optical modulator is provided with an optical waveguide, an electrode provided opposite to the optical waveguide, and a buffer layer provided between the optical waveguide and the electrode. A main material of the buffer layer is lanthanum fluoride.

6 Claims, 2 Drawing Sheets

OPTICAL MODULATOR

BACKGROUND OF THE INVENTION

Field of the Invention

The present invention relates to an optical modulator used in the fields of optical communication and optical measurement and, more particularly, to a material of a buffer layer covering an optical waveguide.

Description of Related Art

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

The optical modulator is one of the typical electro-optical devices, and a Mach-Zehnder optical modulator in which an optical waveguide is formed by Ti (titanium) diffusion in the vicinity of the surface of a lithium niobate single-crystal substrate has been put to practical use. The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

On the other hand, WO 2017/183484 and WO 2016/158650 disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

Further, JP 5,853,880 describes an optical modulator including: a single crystal substrate having a dielectric constant of 17 or less; an electro-optical film formed on the single crystal substrate, having an optical refractive index of nc, having a film thickness of 2 $\mu$m or less, and having LiNbO$_3$ as a main component; a traveling wave electrode for applying voltage to the electro-optical film; and a buffer layer formed between the electro-optical film and the traveling wave electrode, having a dielectric constant of $\varepsilon$b, and having an optical refractive index of nb. In the disclosed optical modulator, (nc−nb) $\varepsilon$b>3.5 is satisfied.

In an optical modulator, a buffer layer existing between an optical waveguide and an RF signal electrode can have a smaller optical loss with a lower refractive index and can have a lower half-wavelength voltage V$\pi$ with a higher dielectric constant, thereby improving V$\pi$ characteristics.

However, the low refractive index and the high dielectric constant are in a trade-off relationship. That is, a material having a low refractive index is also low in dielectric constant; and conversely, a material having a high dielectric constant is also high in refractive index. Such a material having a low refractive index and a high dielectric constant therefore does not exist among oxide materials. Resin materials have a low refractive index, and are high in mass-productivity since they can be coated by spin coating; however, they are not suitable as a material for the buffer layer due to their low dielectric constant.

SUMMARY

It is therefore an object of the present invention to provide an optical modulator having a buffer layer with a low refractive index and a high dielectric constant.

To solve the above problem, an optical modulator according to the present invention includes an optical waveguide, an electrode provided opposite to the optical waveguide, and a buffer layer provided between the optical waveguide and the electrode, wherein a main material of the buffer layer is lanthanum fluoride.

According to the present invention, a buffer layer with a low refractive index and a high dielectric constant can be formed, and both low refractive index and high dielectric constant can be satisfied at the same time, which has not been achieved with oxide materials. The phrase "a main material of the buffer layer is lanthanum fluoride" means that the buffer layer may contain some impurities or additives as long as the main component of the buffer layer is LaF$_3$.

In the present invention, a thickness of the buffer layer is preferably 0.3 $\mu$m or more and 3 $\mu$m or less. When the thickness of the buffer layer mainly made of lanthanum fluoride falls within the range of 0.3 $\mu$m to 3 $\mu$m, both a low light absorption loss and a low drive voltage can be satisfied.

In the present invention, the optical waveguide is preferably made of lithium niobate. In particular, when an optical waveguide formed of a lithium niobate film processed into a ridge shape is used, it is possible to obtain an optical waveguide having satisfactory electro-optical characteristics even at high frequencies higher than 10 GHz.

In the present invention, the optical waveguide preferably includes a Mach-Zehnder optical waveguide. This allows a Mach-Zehnder optical modulator having satisfactory modulation characteristics to be achieved.

According to the present invention, there can be provided an optical modulator having a buffer layer with a low refractive index and a high dielectric constant.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 1B illustrates the entire optical modulator including a traveling wave electrode.

DETAILED DESCRIPTION OF THE EMBODIMENTS

A preferred embodiment of the present invention will be described in detail with reference to the accompanying drawings.

Figure 1A:
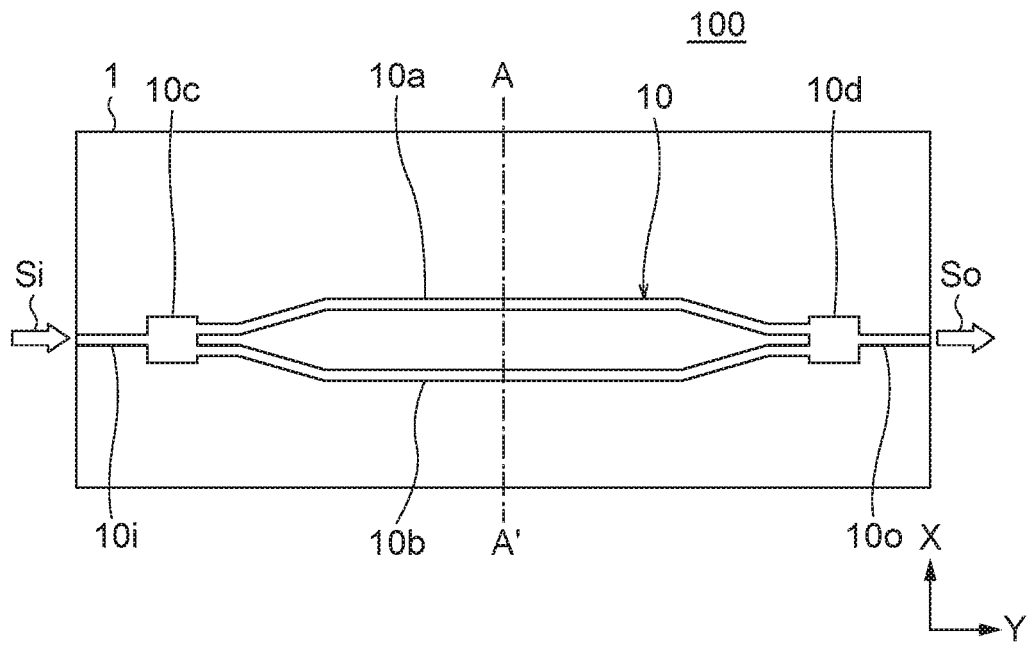
FIGS. 1A and 1B are plan views illustrating the configuration of an optical modulator according to the embodiment of the present invention, in which FIG. 1A only illustrates an optical waveguide.
Figure 1B:
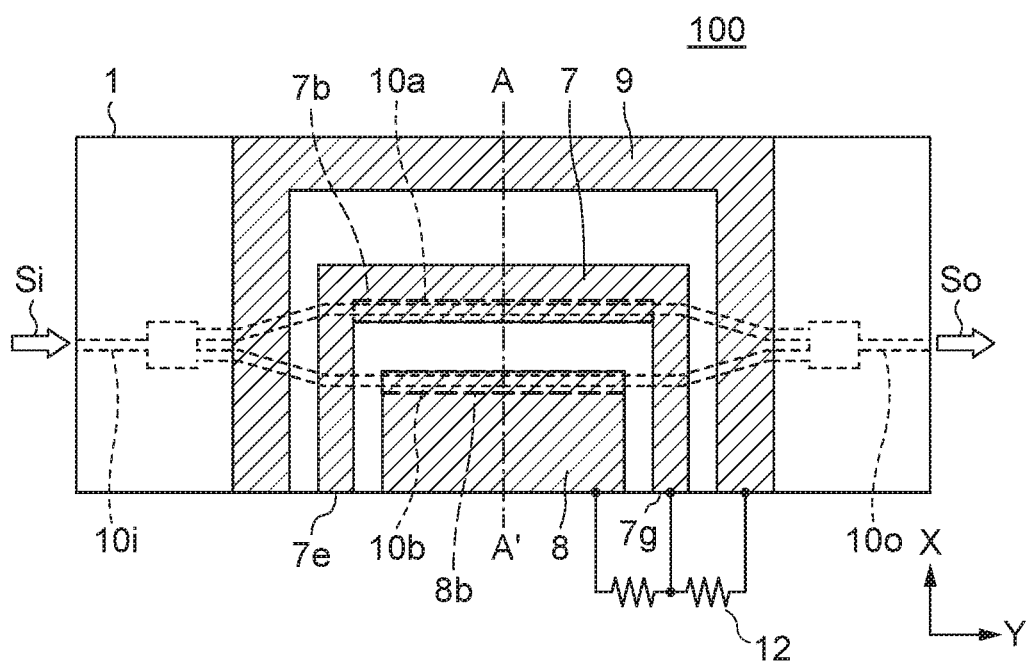

FIGS. 1A and 1B are plan views illustrating the configuration of an optical modulator according to the embodiment of the present invention. FIG. 1A only illustrates an optical waveguide, and FIG. 1B illustrates the entire optical modulator including a traveling wave electrode.

As illustrated in FIGS. 1A and 1B, an optical modulator 100 includes a Mach-Zehnder optical waveguide 10, a signal electrode 7, a first ground electrode 8, and a second ground electrode 9. The Mach-Zehnder optical waveguide 10 is formed on a substrate 1 and has first and second optical waveguides 10a and 10b which extend in parallel to each other. The signal electrode 7 is formed along the first optical waveguide 10a. The first ground electrode 8 is formed along the second optical waveguide 10b. The second ground electrode 9 is formed on a side opposite to the first ground electrode 8 with respect to the signal electrode 7.

The Mach-Zehnder optical waveguide 10 is an optical waveguide having a Mach-Zehnder interferometer structure. The Mach-Zehnder optical waveguide 10 has the first and second optical waveguides 10a and 10b which are branched from a single input optical waveguide 10i at a demultiplexer 10c, and the first and second optical waveguides 10a and 10b are combined into a single output optical waveguide 10o at a multiplexer 10d. An input light Si is demultiplexed at the demultiplexer 10c. The demultiplexed lights travel through the first and second optical waveguides 10a and 10b and are then multiplexed at the multiplexer 10d. The multiplexed light is output from the output optical waveguide 10o as a modulated light So.

The signal electrode 7 is positioned between the first and second ground electrodes 8 and 9 in a plan view. One end 7e of the signal electrode 7 serves as a signal input terminal, and the other end 7g thereof is connected to the first and second ground electrodes 8 and 9 through a terminal resistor 12. As a result, the signal electrode 7 and the first and second ground electrodes 8 and 9 function as a coplanar traveling wave electrode. Although the detail will be described later, the signal electrode 7 and the first ground electrode 8 each have a two-layer structure. A lower layer part 7b of the signal electrode 7 denoted by the dashed line overlaps the first optical waveguide 10a in a plan view, and a lower layer part 8b of the first ground electrode 8 denoted by the dashed line overlaps the second optical waveguide 10b in a plan view.

An electric signal (modulated signal) is input to the one end 7e of the signal electrode 7. The first and second optical waveguides 10a and 10b are made of an electro-optical material, such as lithium niobate, so that the refractive indices of the first and second optical waveguides 10a and 10b are changed with +Δn and −Δn by an electric field applied to the first and second optical waveguides 10a and 10b, with the result that a phase difference between the pair of optical waveguides is changed. A signal light modulated by the change in the phase difference is output from the output optical waveguide 10o.

A pair of bias electrodes (not illustrated) may be provided at positions overlapping the first and second optical waveguides 10a and 10b so as to apply DC bias to the first and second optical waveguides 10a and 10b. One ends of the bias electrode pair are each an input port of the DC bias. The formation area of the bias electrode pair may be closer to the input port side or output port side of the optical waveguide than the formation area of the signal electrode 7. Further, the bias electrode pair may be omitted, and instead, a modulated signal including superimposed DC bias may be input to the signal electrode 7.

As described above, the optical modulator 100 according to the present embodiment is of a single drive type constituted by one signal electrode 7, so that a sufficient area can be ensured for the first ground electrode 8, allowing operation at high frequencies. Further, by disposing the second ground electrode 9 on the side opposite to the first ground electrode 8 across the signal electrode 7, radiation loss can be reduced, whereby more satisfactory high-frequency characteristics can be obtained.

Figure 2:
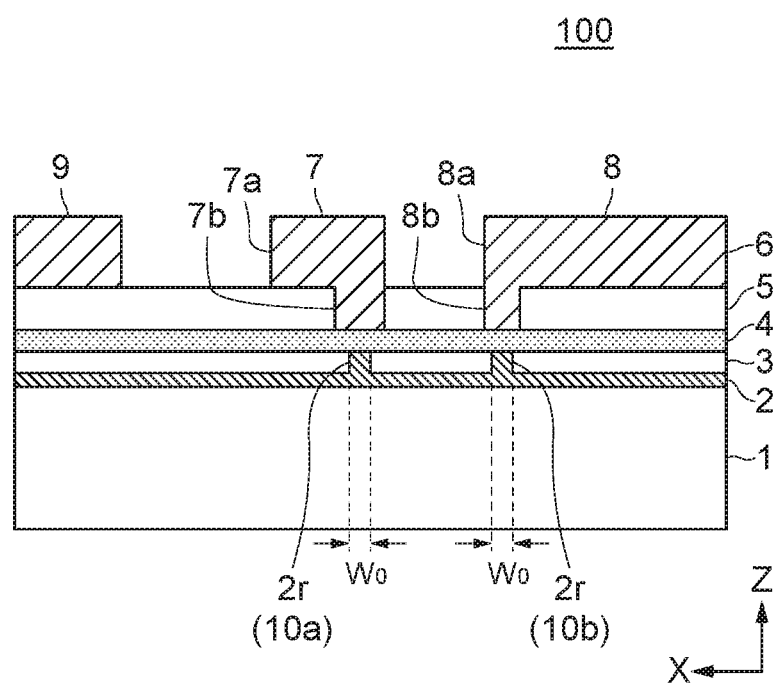
FIG. 2 is a schematic cross-sectional view of the optical modulator taken along line A-A' of FIGS. 1A and 1B.

FIG. 2 is a schematic cross-sectional view of the optical modulator taken along line A-A' of FIGS. 1A and 1B.

As illustrated in FIG. 2, the optical modulator 100 according to the present embodiment has a multilayer structure including a substrate 1, a waveguide layer 2, a protective layer 3, a buffer layer 4, an insulating layer 5, and an electrode layer 6 which are laminated in this order.

The substrate 1 is, e.g., a sapphire substrate, and the waveguide layer 2 composed of a lithium niobate film is formed on the surface of the substrate 1. The waveguide layer 2 has the first and second optical waveguides 10a and 10b each formed by a ridge part 2r. A width Wo of each of the first and second optical waveguides 10a and 10b can be set to, e.g., 1 µm. While the waveguide layer 2 is not particularly limited in type as long as it is made of an electro-optical material, it is preferably made of lithium niobate ($LiNbO_3$). This is because lithium niobate has a large electro-optical constant and is thus suitable as the constituent material of an optical device such as an optical modulator.

The protective layer 3 is formed in an area not overlapping the first and second optical waveguides 10a and 10b in a plan view. The protective layer 3 covers the entire area of the upper surface of the waveguide layer 2 excluding portions where the ridge parts 2r are formed, and the side surfaces of each of the ridge part 2r are also covered with the protective layer 3, so that scattering loss caused due to the roughness of the side surfaces of the ridge part 2r can be prevented. The thickness of the protective layer 3 is substantially equal to the height of the ridge part 2r of the waveguide layer 2. There is no particular restriction on the material of the protective layer 3 and, for example, silicon oxide ($SiO_2$) may be used.

The buffer layer 4 is formed on the upper surfaces of the ridge parts 2r constituting the first and second optical waveguides 10a and 10b so as to prevent light propagating through the first and second optical waveguides 10a and 10b from being absorbed by the signal electrode 7 or first ground electrode 8. The buffer layer 4 is preferably made of a material having a lower refractive index than that of the waveguide layer 2 and a high transparency. The thickness of the buffer layer 4 immediately above the ridge part 2r is preferably 0.3 µm or more and 3 µm or less. It is preferable for the film thickness of the buffer layer 4 to be as large as possible in order to reduce light absorption of an electrode and to be also as small as possible in order to apply a high electric field to the first and second optical waveguides 10a and 10b. The light absorption and applied voltage of an electrode are in a trade-off relationship, so that it is necessary to select a material having a high dielectric constant and a low refractive index while taking the balance therebetween into account.

In the present embodiment, while the buffer layer 4 covers not only the upper surfaces of the respective first and second optical waveguides 10a and 10b, but also the entire underlying surface including the upper surface of the protective layer 3, it may be patterned so as to selectively cover only the vicinity of the upper surfaces of the first and second optical waveguides 10a and 10b. Further, the buffer layer 4 may be directly formed on the entire upper surface of the waveguide layer 2 with the protective layer 3 omitted.

The insulating layer 5 is provided to form a level difference on the lower surface of the traveling wave electrode. Openings (slits) are formed in areas of the insulating layer 5 that overlap the respective first and second optical waveguides 10a and 10b to expose the upper surface of the buffer layer 4 therethrough. A part of the electrode layer 6 is embedded in the openings, with the result that the level differences are formed on the lower surfaces of the signal electrode 7 and first ground electrode 8. The thickness of the insulating layer 5 is preferably equal to or larger than 1 µm. When the thickness of the insulating layer 5 is equal to or larger than 1 µm, an effect based on the formation of the level difference on the lower surfaces of the respective signal electrode 7 and first ground electrode 8 can be obtained.

The electrode layer 6 is provided with the signal electrode 7, first ground electrode 8, and second ground electrode 9. The signal electrode 7 is provided overlapping the ridge part 2r corresponding to the first optical waveguide 10a so as to modulate light traveling inside the first optical waveguide 10a and opposed to the first optical waveguide 10a through the buffer layer 4. The first ground electrode 8 is provided overlapping the ridge part 2r corresponding to the second optical waveguide 10b so as to modulate light traveling inside the second optical waveguide 10b and opposed to the second optical waveguide 10b through the buffer layer 4. The second ground electrode 9 is provided on the side opposite to the first ground electrode 8 across the signal electrode 7.

The signal electrode 7 has a two-layer structure and has an upper layer part 7a formed on the electrode layer 6 and a lower layer part 7b embedded in an opening (first opening) penetrating the insulating layer 5. The lower layer part 7b of the signal electrode 7 is positioned at the end portion of the upper layer part 7a of the signal electrode 7 close to the first ground electrode 8. Accordingly, the lower surface of the lower layer part 7b of the signal electrode 7 is positioned closer to the first ground electrode 8 than the lower surface of the upper layer part 7a. With this configuration, the lower surface of the lower layer part 7b of the signal electrode 7 contacts the upper surface of the buffer layer 4 above the first optical waveguide 10a to cover the first optical waveguide 10a through the buffer layer 4. The lower surface of the upper layer part 7a of the signal electrode 7 is positioned above the lower surface of the lower layer part 7b and does not contact the buffer layer 4.

The first ground electrode 8 also has a two-layer structure and has an upper layer part 8a formed on the electrode layer 6 and a lower layer part 8b embedded in an opening (second opening) penetrating the insulating layer 5. The lower layer part 8b of the first ground electrode 8 is positioned at the end portion of the upper layer part 8a of the first ground electrode 8 close to the signal electrode 7. Accordingly, the lower surface of the lower layer part 8b of the first ground electrode 8 is positioned closer to the signal electrode 7 than the lower surface of the upper layer part 8a. With this configuration, the lower surface of the lower layer part 8b of the first ground electrode 8 contacts the upper surface of the buffer layer 4 above the second optical waveguide 10b to cover the second optical waveguide 10b through the buffer layer 4. The lower surface of the upper layer part 8a of the first ground electrode 8 is positioned above the lower surface of the lower layer part 8b and does not contact the buffer layer 4.

The second ground electrode 9 is positioned on the side opposite to the first ground electrode 8 across the signal electrode 7. The second ground electrode 9 has a single layer structure constituted of only a conductor provided in the electrode layer 6; however, it may have a two-layer structure like the signal electrode 7 and first ground electrode 8.

The following describes in detail the configuration of the optical modulator when the waveguide layer 2 is formed of the lithium niobate film.

Although the substrate 1 is not particularly limited in type as long as it has a lower refractive index than the lithium niobate film, it is preferably a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The term "epitaxial film", as used herein, refers to a film having the crystal orientation of the underlying substrate or film. The crystal of an epitaxial film is uniformly oriented along the X-axis and Y-axis on the film surface and along the Z-axis in the thickness direction. For example, an epitaxial film can be confirmed by firstly measuring the peak intensity at the orientation position by 2θ-θ X-ray diffraction and secondly observing poles.

Specifically, first, in the 2θ-θ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002) and other equivalent surfaces.

Secondly, poles must be observable in the measurement. Under the condition where the peak intensities are measured at the first orientation position, only the orientation in a single direction is proved. Even if the first condition is satisfied, in the case of nonuniformity in the in-plane crystalline orientation, the X-ray intensity does not increase at a particular angle, and poles cannot be observed. Since $LiNbO_3$ has a trigonal crystal system structure, single-crystal $LiNbO_3$ (014) has 3 poles. For the lithium niobate film, it is known that crystals rotated by 180° about the c-axis are epitaxially grown in a symmetrically coupled twin crystal state. In this case, three poles are symmetrically coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_AyO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of equal to or smaller than 2 µm. This is because a high-quality lithium niobate film having a thickness larger than 2 μm is difficult to form. The lithium niobate film having an excessively small thickness cannot completely confine light in it, allowing the light to penetrate through the substrate 1 and/or the buffer layer 4. Application of an electric field to the lithium niobate film may therefore cause a small change in the effective refractive index of the optical waveguides (10a and 10b). Thus, the lithium niobate film preferably has a film thickness that is at least approximately one-tenth of the wavelength of light to be used.

The film thickness of the lithium niobate film in an electric field application area is preferably 1 μm or more and, more preferably, 1.4 μm or more. Under the condition that the wavelength λ of light is 1550 nm which is used in an optical communication system, when the film thickness of the lithium niobate film is set to less than 1 μm, the half-wavelength voltage Vπc abruptly increases, making it difficult to make the half-wavelength voltage Vπ equal to or less than 3V which is a practical voltage value. This is because when the film thickness is small, light confinement into the lithium niobate film becomes weak to effectively reduce an electro-optical effect. On the other hand, when the film thickness of the lithium niobate film is set to 1.5 μm or more, light confinement becomes sufficiently strong, so that the Vπ hardly changes even when the film thickness exceeds this value. As described above, when the film thickness of the lithium niobate film is set to 1 μm or more, a drive voltage and a propagation loss can be reduced.

The lithium niobate film is preferably formed using a film formation method, such as sputtering, CVD or sol-gel process. Application of an electric field in parallel to the c-axis of the lithium niobate that is oriented perpendicular to the main surface of the substrate 1 can change the optical refractive index in proportion to the electric field. In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing a lithium niobate single crystal substrate. This method has an advantage that the same characteristics as those of the single crystal can be obtained and can be applied to the present invention.

The following describes the buffer layer 4.

It is preferable for the refractive index of the buffer layer 4 to be as low as possible, because the lower the refractive index, the stronger the light is confined, and it is preferable for the dielectric constant of the buffer layer 4 to be as high as possible, because the higher the dielectric constant, the more VπL (index representing electric field efficiency) decreases. Conventionally, oxide materials such as $Al_2O_3$, $LaAlO_3$, and $LaYO_3$ have been preferably used for the buffer layer 4. For example, $Al_2O_3$ has a specific dielectric constant of about 9 and a refractive index of about 1.6 and is thus preferable for the buffer layer 4. $LaAlO_3$ has a specific dielectric constant of about 13 and a refractive index of about 1.7 and is more preferable than $Al_2O_3$. $LaYO_3$ has a specific dielectric constant of about 17 and a refractive index of about 1.7 and are thus more preferable than $LaAlO_3$. However, in general, a material having a low refractive index is also low in dielectric constant; and conversely, a material having a high dielectric constant is also high in refractive index. That is, the low refractive index and the high dielectric constant are in a trade-off relationship, so that this trade-off is unavoidable as long as the oxide material is used.

Thus, in the present embodiment, lanthanum fluoride ($LaF_3$) is used for the buffer layer 4. The use of lanthanum fluoride for the buffer layer 4 allows both the low refractive index and high dielectric constant of the buffer layer 4 to be satisfied. A reduction in the refractive index of the buffer layer 4 can suppress the spreading of electric field of the light in the optical waveguide, thereby allowing the buffer layer 4 to have high performance. Further, an increase in the dielectric constant of the buffer layer 4 allows the application of a strong electric field to the optical waveguide without requiring the thinning of the buffer layer 4, making it possible to reduce a voltage required for phase control.

The buffer layer only needs to have $LaF_3$ as a main component and may contain some impurities or additives. Thus, the buffer layer 4 may contain impurities such as $InF_3$, $ZrF_4$, $BaF_3$, $AlF_3$, and $NdF_3$. A $LaF_3$ film may be formed by, e.g., a vapor deposition method.

The thickness of the buffer layer 4 having the lanthanum fluoride as a main component is preferably 0.3 μm or more and 3 μm or less. When the thickness of the buffer layer 4 exceeds 3 μm, it becomes difficult to apply a high electric field to the optical waveguide. On the other hand, when the thickness of the buffer layer 4 is smaller than 0.3 μm, the light propagating in the optical waveguide is easily absorbed by an electrode to increase a light absorption loss. When the thickness of the buffer layer 4 falls within the range of 0.3 μm to 3 μm, both a low light absorption loss and a low drive voltage can be satisfied.

TABLE 1

| Dielectric material for buffer layer | RF performance index K = (2.14 − n)*∈ | Refractive index n (@wavelength) | | Dielectric constant ∈ (@frequency) | |
|---|---|---|---|---|---|
| $Al_2O_3$ | 4.732 | 1.62 | (@0.63 μm) | 9.1 | (@1 MHz) |
| $LaAlO_3$ | 5.590 | 1.71 | (@0.63 μm) | 13 | (@1 MHz) |
| $LaYO_3$ | 6.970 | 1.73 | (@0.63 μm) | 17 | (@1 MHz) |
| $LaF_3$ | 8.260 | 1.55 | (@0.63 μm) | 14 | (@10 MHz) |
| $CaF_2$ | 5.032 | 1.40 | (@5 μm) | 6.8 | (@1 MHz) |
| $BaF_2$ | 4.964 | 1.46 | (@2.6 μm) | 7.3 | (@2 MHz) |

Table 1 shows an RF performance index K, a refractive index n, and a dielectric constant E of a dielectric material used for the buffer layer 4. The RF performance index K=(2.14−n)×ε is an index indicating the performance of the buffer layer 4, and the higher the RF performance index K is, the lower the refractive index becomes and the higher the dielectric constant becomes. That is, the buffer layer having higher RF performance index has more improved performance.

As shown in Table 1, in the case of $Al_2O_3$ which is a typical oxide material, the refractive index n=1.62 (@0.63 μm), dielectric constant ε=9.1 (@1 MHz), and RF performance index K=4.732. In the case of $LaAlO_3$, the refractive index n=1.71 (@0.63 μm), dielectric constant ε=13 (@1 MHz), and RF performance index K=5.590. In the case of $LaYO_3$, the refractive index n=1.73 (@0.63 μm), dielectric constant ε=17 (@1 MHz), and RF performance index K=6.970.

On the other hand, in the case of $LaF_3$, the refractive index n=1.55 (@0.63 μm), dielectric constant ε=14 (@10 MHz), and RF performance index K=8.260. Thus, a RF performance index higher than that of $LaYO_3$ can be achieved. The RF performance indices K of other fluoride materials, such as $CaF_2$ and $BaF_2$ are 5.5 or less and, thus, it can be seen that the RF performance index K of $LaF_3$ is particularly high.

As described above, the optical modulator 100 according to the present embodiment includes the first and second optical waveguides 10a and 10b, the signal electrode 7 and first ground electrode 8 formed above the buffer layer 4 so as to be opposed respectively to the first and second optical waveguides 10a and 10b, and the buffer layer 4 formed between the first optical waveguide 10a and the signal electrode 7 and between the second optical waveguide 10b and the first ground electrode 8, and the buffer layer 4 is made of lanthanum fluoride. With this configuration, it is possible to achieve an optical modulator having the buffer layer 4 with a low refractive index and a high dielectric constant.

While the preferred embodiments of the present invention have been described, the present invention is not limited to the above embodiments, and various modifications may be made within the scope of the present invention, and all such modifications are included in the present invention.

For example, in the above embodiment, an optical modulator of a single drive type that uses the single signal electrode 7 to drive the light propagating in the first optical waveguide 10a is employed, although the specific configuration of the optical modulator is not particularly limited in the present invention. Thus, for example, the present invention is applicable to an optical modulator of a dual drive type in which differential signals (modulated signals) are input to a pair of signal electrodes corresponding to the first and second optical waveguides 10a and 10b to drive both of the lights propagating in the first optical waveguide 10a and in the second optical waveguide 10b.

Further, in the above embodiment, the buffer layer 4 in the RF part of the optical modulator in which the signal electrode 7 is provided is made of lanthanum fluoride and, although not particularly described, the buffer layer 4 in the DC part of the optical modulator in which the bias electrode is provided may also be made of lanthanum fluoride. Alternatively, the buffer layer 4 in the DC part of the optical modulator may be made of a material different from that of the buffer layer 4 in the RF part. In this case, for example, the buffer layer 4 in the RF part may be made of lanthanum fluoride, and the buffer layer 4 in the DC part may be made of an oxide material or a fluoride material other than lanthanum fluoride.

Further, while an optical modulator using the optical waveguide made of lithium niobate is employed in the above embodiment, the present invention is also applicable to an optical modulator in which an optical waveguide is formed by diffusing Ti into a lithium niobate single crystal substrate. That is, the optical waveguide is not particularly limited in configuration as long as it is made of lithium niobate and may be a ridge shape lithium niobate film or may be a lithium niobate single crystal bulk substrate in which Ti is diffused.

What is claimed is:

1. An optical modulator comprising:
   an optical waveguide;
   an electrode provided on the optical waveguide; and
   a buffer layer provided between the optical waveguide and the electrode,
   wherein a main material of the buffer layer is lanthanum fluoride, and
   wherein a thickness of the buffer layer is 0.3 µm or more and 3 µm or less.

2. The optical modulator as claimed in claim 1, wherein the optical waveguide is made of lithium niobate.

3. The optical modulator as claimed in claim 1, wherein the optical waveguide includes a Mach-Zehnder optical waveguide.

4. The optical modulator, wherein the thickness of the buffer layer is more than 1.0 µm and 3 µm or less.

5. The optical modulator, wherein the thickness of the buffer layer is more than 1.5 µm and 3 µm or less.

6. The optical modulator, wherein the thickness of the buffer layer is more than 2.5 µm and 3 µm or less.

* * * * *